(12) United States Patent
Hwang et al.

(10) Patent No.: US 7,766,530 B2
(45) Date of Patent: Aug. 3, 2010

(54) BACKLIGHT, A LENS FOR A BACKLIGHT, AND A BACKLIGHT ASSEMBLY HAVING THE SAME

(75) Inventors: Seong Yong Hwang, Seongnam-Si (KR); Se Ki Park, Suwon-Si (KR); Jin Sung Choi, Cheonan-Si (KR); Jin Soo Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 120 days.

(21) Appl. No.: 11/923,106

(22) Filed: Oct. 24, 2007

(65) Prior Publication Data

US 2008/0100773 A1    May 1, 2008

(30) Foreign Application Priority Data

Oct. 31, 2006    (KR) ..................... 10-2006-0106462

(51) Int. Cl.
*F21V 5/04*    (2006.01)

(52) U.S. Cl. ..................... 362/613; 362/240; 362/244; 362/97.3; 362/612

(58) Field of Classification Search ....... 362/97.1–97.4, 362/612, 613, 617–619, 237, 240, 244, 335, 362/336
See application file for complete search history.

(56) References Cited

U.S. PATENT DOCUMENTS 2,254,962 A * 9/1941 Bitner et al. ................ 362/327

5,811,219 A    9/1998 No et al.
6,896,381 B2 *    5/2005 Benitez et al. ............. 359/858
7,448,774 B2 *    11/2008 Konuma ..................... 362/309
2003/0075167 A1 *    4/2003 Minano Dominguez et al. ......................... 126/680
2005/0238968 A1    10/2005 Caspar et al.

FOREIGN PATENT DOCUMENTS

| JP | 6034812 | 2/1994 |
| JP | 2000187111 | 7/2000 |
| JP | 2001235618 | 8/2001 |
| JP | 2001312072 | 11/2001 |
| JP | 2003098334 | 4/2003 |
| JP | 2003322716 | 11/2003 |
| JP | 2004085773 | 3/2004 |
| JP | 2006139251 | 6/2006 |
| KR | 1019970000355 | 1/1997 |
| KR | 1020030034009 | 5/2003 |
| KR | 1020040091341 | 10/2004 |
| KR | 1020050075197 | 7/2005 |

* cited by examiner

*Primary Examiner*—Thomas M Sember
(74) *Attorney, Agent, or Firm*—F. Chau & Associates, LLC

(57) ABSTRACT

A lens for a backlight, including: a light transmissive body including outer and inner surface areas, the outer surface area having a convex surface and a concave surface, the inner surface area having a convex surface and a concave surface, wherein the convex surface of the outer surface area has a curvature different from a curvature of the convex surface of the inner surface area and the concave surface of the outer surface area has a curvature different from a curvature of the concave surface of the inner surface area.

20 Claims, 9 Drawing Sheets

US 7,766,530 B2

BACKLIGHT, A LENS FOR A BACKLIGHT, AND A BACKLIGHT ASSEMBLY HAVING THE SAME

CROSS-REFERENCE TO RELATED PATENT APPLICATION

This application claims priority to Korean Patent Application No. 2006-0106462, filed on Oct. 31, 2006, in the Korean Intellectual Property Office, the disclosure of which is incorporated by reference herein in its entirety.

BACKGROUND OF THE INVENTION

1. Technical Field

The present invention relates backlights, and more particularly, to a lens for a backlight capable of uniform illuminance distribution, a backlight capable of preventing a light leakage phenomenon, and a backlight assembly having the same.

2. Discussion of the Related Art

A liquid crystal display device displays an image by using a separate light source. In other words, the liquid crystal display device does not emit light by itself. Therefore, the liquid crystal display device includes a lighting unit such as a backlight.

A cold cathode fluorescent lamp (CCFL) has been used as a conventional light source for the backlight. In some applications, the CCFL has been replaced with a light emitting diode (LED) element having features such as elongated life, low power consumption, light weight, and slim size.

A backlight may include a plurality of LED elements disposed as a surface light source on a plane for supplying light to a flat panel liquid crystal display device. In this configuration, the light emitted to an overhead area of the LED element (e.g., directly upward) has a greatest intensity; however, the intensity of the light gradually decreases from the overhead area to a peripheral area of the LED element. In other words, an illuminance distribution on a horizontal plane spaced a predetermined distance apart from the LED element exhibits a substantial Gaussian distribution, thus the light emitted from the LED element is not uniformly distributed over a wide area.

When such an LED element is used as a surface light source of the backlight, the LED elements should be arranged at small intervals. However, this increases the number of LED elements disposed on a plane and, in turn, the manufacturing cost of the backlight. Further, the light emitted from the LED element spreads to the overhead and peripheral areas of the LED element. Thus, for example, when some of the LED elements in the backlight are driven to locally supply light to an area of a liquid crystal display device, the light spreads to the overhead and peripheral areas of the LED element, thereby causing a light leakage phenomenon.

Accordingly, there exists a need for a backlight that includes a plurality of LED elements that provides uniform luminance distribution and that prevents a light leakage phenomenon.

SUMMARY OF THE INVENTION

According to an exemplary embodiment of the present invention, there is provided a lens for a backlight, comprising a light transmissive body including outer and inner surface areas, the outer surface area having a convex surface and a concave surface, the inner surface area having a convex surface and a concave surface, wherein the convex surface of the outer surface area has a curvature different from a curvature of the convex surface of the inner surface area and the concave surface of the outer surface area has a curvature different from a curvature of the concave surface of the inner surface area.

The curvature of the convex surface of the inner surface area is greater than the curvature of the convex surface of the outer surface area, and the curvature of the concave surface of the inner surface area is smaller than the curvature of the concave surface of the outer surface area.

The convex surface of the outer surface area is disposed in a central area of the light transmissive body and has a first curvature; the concave surface of the outer surface area has a second curvature and extends from an end of the convex surface of the outer surface area to an edge of the light transmissive body; the convex surface of the inner surface area is disposed in the central area of the light transmissive body and has a third curvature greater than the first curvature; and the concave surface of the inner surface area has a fourth curvature smaller than the second curvature and extends from an end of the convex surface of the inner surface area to the edge of the light transmissive body. The third curvature is about 1.5 times to about 10 times greater than the first curvature and the second curvature is about 1.5 times to about 5 times greater than the fourth curvature.

According to an exemplary embodiment of the present invention, there is provided a backlight comprising a substrate; a plurality of light emitting diode (LED) elements mounted on the substrate; and a plurality of lenses, each lens disposed over an LED element of the plurality of LED elements, each lens including a light transmissive body having outer and inner surface areas, the outer surface area having a convex surface and a concave surface, the inner surface area having a convex surface and a concave surface, wherein the convex surface of the outer surface area has a curvature different from a curvature of the convex surface of the inner surface area and the concave surface of the outer surface area has a curvature different from a curvature of the concave surface of the inner surface area.

The convex surface of the outer surface area is disposed in a central area of the light transmissive body and has a first curvature; the concave surface of the outer surface area has a second curvature and extends from an end of the convex surface of the outer surface area to an edge of the light transmissive body; the convex surface of the inner surface area is disposed in a central area of the light transmissive body and has a third curvature greater than the first curvature; and the concave surface of the inner surface area has a fourth curvature smaller than the second curvature and extends from an end of the convex surface of the inner surface area to the edge of the light transmissive body. The LED element is disposed under the concave surface of the inner surface area.

Each lens further comprises a protruding member disposed in a lower peripheral area of the light transmissive body. Each lens further comprises a fixing means for fixing the light transmissive body to the substrate.

When a full width at a half maximum (FWHM) of an illuminance distribution of each lens is 1, an interval between adjacent LED elements of the plurality of LED elements can be about 0.8 to about 1.2.

The plurality of LED elements emit light on an element-by-element basis, or on a group-by-group basis when the plurality of LED elements are divided into at least two groups.

According to an exemplary embodiment of the present invention, there is provided a backlight comprising a substrate; a plurality of LED elements mounted on the substrate; and a lens disposed over the plurality of LED elements, the lens including a light transmissive body having outer and inner surface areas, the outer surface area having a convex surface and a concave surface, the inner surface area having a convex surface and a concave surface, wherein the convex surface of the outer surface area has a curvature different from a curvature of the convex surface of the inner surface area and the concave surface of the outer surface area has a curvature different from a curvature of the concave surface of the inner surface area.

The convex surface of the outer surface area is disposed in a longitudinally extending central area of the light transmissive body and has a first curvature; the concave surface of the outer surface area has a second curvature and extends from an end of the convex surface of the outer surface area to a longitudinally extending edge of the light transmissive body; the convex surface of the inner surface area is disposed in the longitudinally extending central area of the light transmissive body and has a third curvature greater than the first curvature; and the concave surface of the inner surface area has a fourth curvature smaller than the second curvature and extends from an end of the convex surface of the inner surface area to the longitudinally extending edge of the light transmissive body. The light transmissive body extends in a longitudinal direction.

The backlight further comprises a filler disposed between the lens and the plurality of LED elements.

According to an exemplary embodiment of the present invention, there is provided a backlight assembly comprising a light source unit including a substrate; a plurality of LED elements disposed on the substrate to emit light; and a plurality of lenses, each lens disposed over an LED element of the plurality of LED elements, each lens including a light transmissive body having outer and inner surface areas, the outer surface area having a convex surface and a concave surface, the inner surface area having a convex surface and a concave surface, wherein the convex surface of the outer surface area has a curvature different from a curvature of the convex surface of the inner surface area and the concave surface of the outer surface area has a curvature different from a curvature of the concave surface of the inner surface area; and a receiving member for receiving the light source unit.

The convex surface of the outer surface area is disposed in a central area of the light transmissive body and has a first curvature; the concave surface of the outer surface area has a second curvature and extends from an end of the convex surface of the outer surface area to an edge of the light transmissive body; the convex surface of the inner surface area is disposed in a central area of the light transmissive body and has a third curvature greater than the first curvature; and the concave surface of the inner surface area has a fourth curvature smaller than the second curvature and extends from an end of the convex surface of the inner surface area to the edge of the light transmissive body.

The plurality of LED elements emit light on an element-by-element basis, on a group-by-group basis when the plurality of LED elements are divided into at least two groups, or on a substrate-by-substrate basis when more than one substrate is included in the light source unit. The backlight assembly further comprises a light guide plate disposed adjacent to the light source unit.

According to an exemplary embodiment of the present invention, there is provided a liquid crystal display device comprising a liquid crystal display panel for displaying an image; and a backlight assembly for emitting light to the liquid crystal display panel, wherein the backlight assembly includes a plurality of LED elements for emitting light; and a plurality of lenses, each lens including a light transmissive body having outer and inner surface areas, the outer surface area having a convex surface and a concave surface, the inner surface area having a convex surface and a concave surface, wherein the convex surface of the outer surface area has a curvature different from a curvature of the convex surface of the inner surface area and the concave surface of the outer surface area has a curvature different from a curvature of the concave surface of the inner surface area.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EXEMPLARY EMBODIMENTS

The present invention will be described more fully hereinafter with reference to the accompanying drawings, in which exemplary embodiments of the invention are shown. This invention may, however, be embodied in many different forms and should not be construed as being limited to the embodiments set forth herein.

Figure 1:
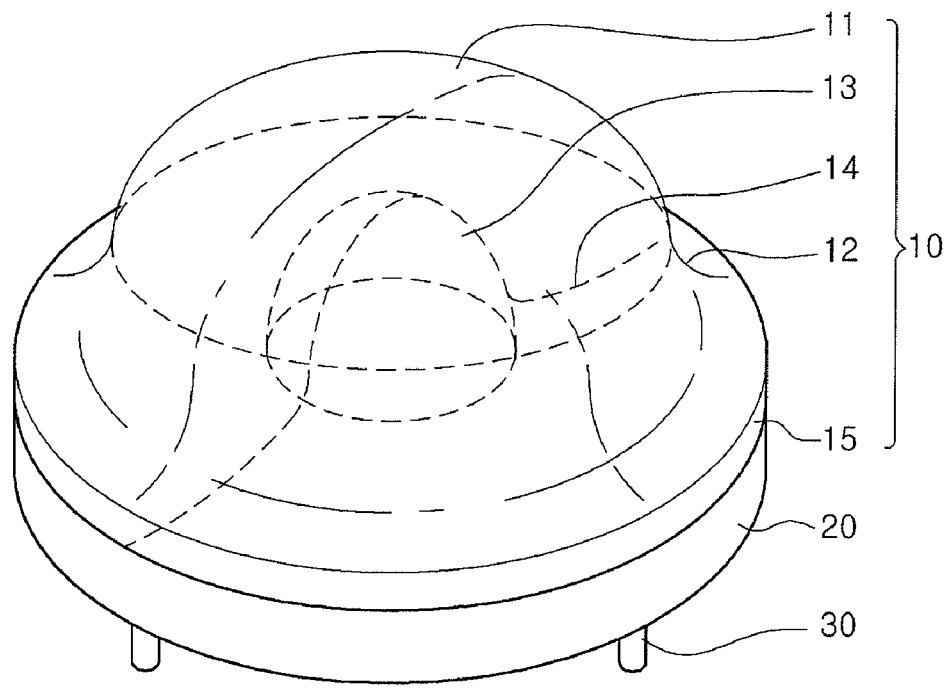
FIG. 1 is a perspective view of a lens for a backlight according to an exemplary embodiment of the present invention.
Figure 2:
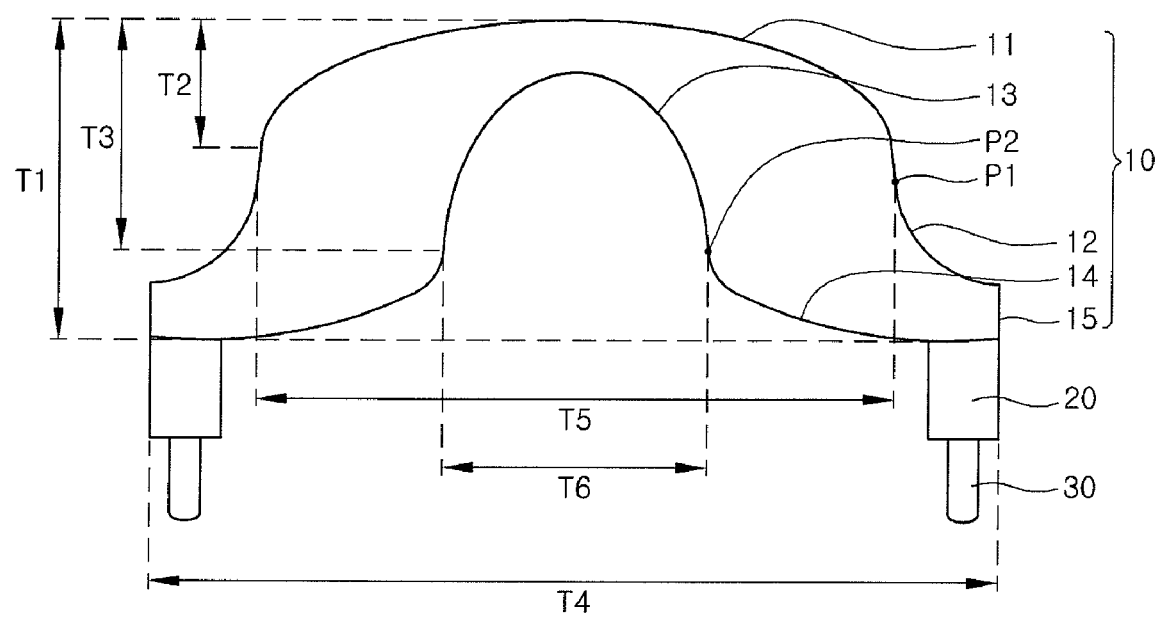
FIG. 2 is a sectional view illustrating the lens of FIG. 1.
Figure 3:
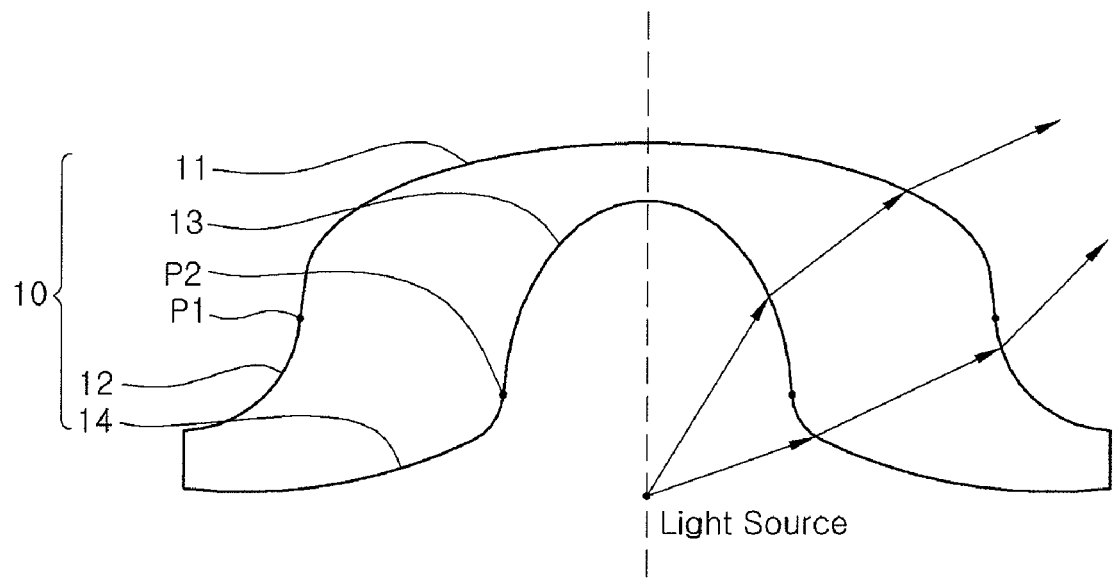
FIG. 3 is a sectional view illustrating a light emitting characteristic of the lens of FIG. 1.
Figure 4:
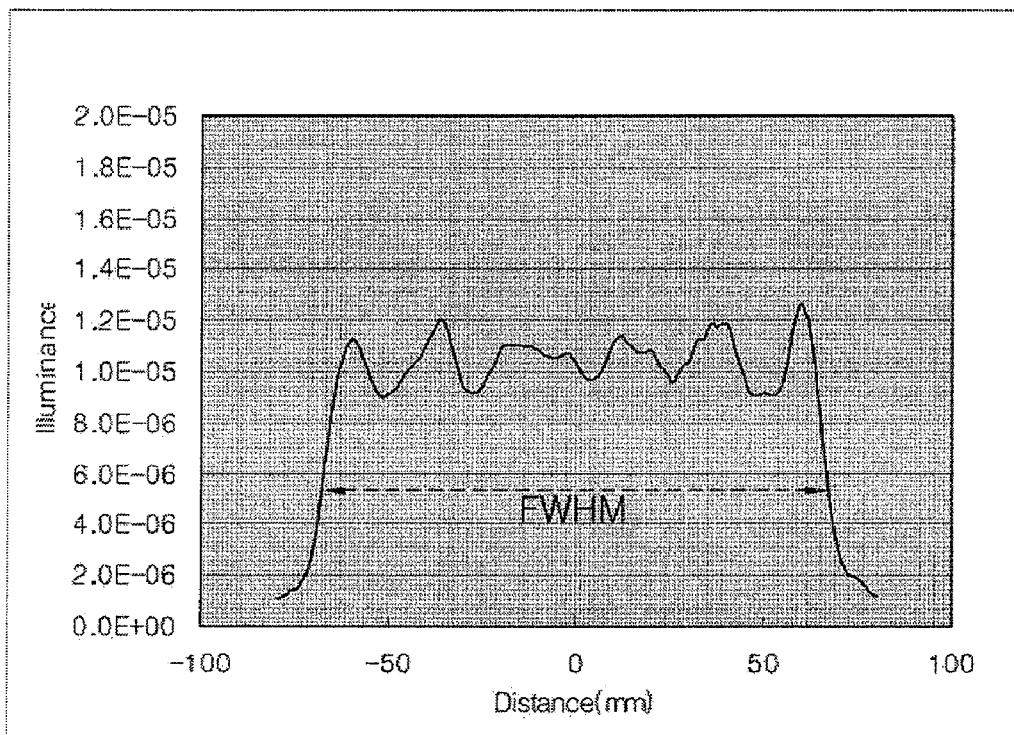
FIG. 4 is a simulation result graph illustrating an illuminance distribution of the lens of FIG. 1.

FIG. 1 is a perspective view of a lens for a backlight according to an exemplary embodiment of the present invention, and FIG. 2 is a sectional view illustrating the lens of FIG. 1. FIG. 3 is a sectional view illustrating a light emitting characteristic of the lens of FIG. 1. FIG. 4 is a simulation result graph illustrating an illuminance distribution of the lens of FIG. 1.

Referring to FIGS. 1 and 2, the lens for a backlight according to this exemplary embodiment includes a light transmissive body 10 having inner and outer curved surfaces.

In the body 10, the outer curved surface includes a convex surface 11 and a concave surface 12, and the inner curved surface includes a convex surface 13 and a concave surface 14. Specifically, the outer curved surface includes the outer convex surface 11 disposed in a central area of the body 10 and having a first curvature, and the outer concave surface 12 having a second curvature and extending from an end of the outer convex surface 11 to an edge of the body 10. In addition, the inner curved surface includes the inner convex surface 13 disposed below the outer convex surface 11 in the central area of the body 10 and having a third curvature greater than the first curvature, and the inner concave surface 14 having a fourth curvature smaller than the second curvature and extending from an end of the inner convex surface 13 to the edge of the body 10. The body 10 further includes a vertical surface 15 for connecting between the end of the outer concave surface 12 and the end of the inner concave surface 14, as shown in FIGS. 1 and 2. The vertical surface 15 may be omitted, if necessary. A curved or slanted surface may be formed in place of the vertical surface 15.

The body 10 is formed in a substantially semi-elliptical spherical shape and provided with a cavity in its internal central portion. The semi-elliptical body 10 includes a concave edge area defined by the outer concave surface 12. The cavity has a substantially semi-elliptical spherical shape by means of the inner convex surface 13.

With the lens for a backlight having this structure, the illuminance of light concentrated on an overhead area of a light source of a backlight can be uniformly distributed over a wide overhead area. For example, in the lens for a backlight of this exemplary embodiment, the outer and inner concave surfaces 12 and 14 disposed in the edge area of the body 10 allow light propagating in a lateral direction of the body 10 to be refracted in an upward direction. The outer and inner convex surfaces 11 and 13 in the central area of the body 10 allow light propagating in the upward direction of the body 10 to be refracted in the lateral direction.

Specifically, as shown in FIG. 3, light emitted to the inner convex surface 13 is refracted by the inner convex surface 13 to be distant from the central axis (indicated by a dotted line in FIG. 3) of the body 10, and light emitted to the outer convex surface 11 is refracted by the outer convex surface 11 to be distant from the central axis of the body 10. These refractions are made at boundaries of the outer and inner convex surfaces 11 and 13. In this manner, the lights emitted to the inner and outer convex surfaces 11 and 13 are refracted at their boundaries and spread to be distant from the central axis of the body 10. In other words, the lights emitted to the central area of the body 10 can spread out in the lateral direction. In this case, the light spread can be adjusted by changing the first and third curvatures of the outer and inner convex surfaces 11 and 13. In other words, the illuminance distribution of the light from the light source concentrated on the central area can be widened by the outer and inner convex surfaces 11 and 13. Meanwhile, light emitted to the inner concave surface 14 is refracted by the inner concave surface 14 toward the central axis of the body 10, and light emitted to the outer concave surface 12 is refracted by the outer concave surface 14 toward the central axis of the body 10. Accordingly, the light emitted to the outer and inner concave surfaces 12 and 14 are refracted at their boundaries and concentrated in the central axis of the body 10. In other words, the light emitted to the edge area of the body 10 can be concentrated in the central area of the body 10. In this case, the light concentration can be adjusted by changing the second and fourth curvatures of the outer and inner concave surfaces 12 and 14.

As described above, according to this exemplary embodiment, the light emitted to the edge area of the body 10 is concentrated in the central area, and the light emitted to the central area is spread in the lateral direction, thus obtaining uniform illuminance distribution over a wide overhead area. In addition, the light can be prevented from spreading to a peripheral area of the lens.

A backlight having the lens according to this exemplary embodiment can have a substantially rectangular illuminance distribution as shown in FIG. 4. Here, the graph of FIG. 4 shows a simulation result illustrating the illuminance distribution on a plane spaced about 40 mm apart from the lens for a backlight, which is disposed under a lower end of the central axis of the lens (e.g., the center of the body 10). It can be seen from FIG. 4 that the illuminance distribution is substantially uniform within a radius of about 60 mm from the center of the body 10 (e.g., light source), but the light illuminance is suddenly reduced in a radius ranging from about 60 mm to about 80 mm. It can also be seen that no light is substantially output in a radius over 80 mm. If a full width at half maximum (FWHM) that is a peak width at a point corresponding to one half of an illuminance peak height is defined as a light diffusion distance, the lens for a backlight according to this exemplary embodiment has a light diffusion distance of about 140 mm.

Accordingly, it can be seen from the graph of FIG. 4 that the light concentrated on the central overhead area of the light source is spread in the lateral direction of the overhead area of the light source by the lens of this exemplary embodiment, and the light spreading in the lateral direction of the light source is concentrated on the overhead area of the light source by the lens. In this manner, the use of the lens of this exemplary embodiment can prevent the light from spreading in the lateral direction of the light source and make the illuminance distribution uniform in a wide overhead area of the light source.

The curvatures of the outer and inner convex surfaces 11 and 13 and the outer and inner concave surfaces 12 and 14 of the lens can be changed to adjust the illuminance distribution. In this exemplary embodiment, the third curvature of the inner convex surface 13 is greater than the first curvature of the outer convex surface 11, and the second curvature of the outer concave surface 12 is greater than the fourth curvature of the inner concave surface 14, thereby obtaining the substantially rectangular illuminance distribution as described above. In this exemplary embodiment, the curvatures of the curved surfaces can be changed to adjust the side slopes of the graph of FIG. 4.

For example, the third curvature of the inner convex surface 13 is about 1.5 times to about 10 times greater than the first curvature of the outer convex surface 11. For example, the third curvature of the inner convex surface 13 is greater than that of the other curved surfaces. The third curvature can be about 2 times to about 5 times greater than the first curvature. In this case, a magnification of the third curvature and the first curvature can be changed to adjust a width of the area having the uniform illuminance distribution. The use of the inner convex surface 13 having the third curvature greater than the first curvature can allow light emitted to the central overhead area of the lens to widely spread in the lateral direction. In addition, the use of the outer convex surface 11 having the first curvature can allow the light illuminance to be uniformly distributed. In this case, when the magnification of the third curvature is smaller than that that of its magnification range, the light does not spread widely and uniformly, thus concentrating the light illuminance distribution on the central area. When the magnification of the third curvature is greater than that of its magnification range, the light in the central area spreads too widely, thus degrading the light illuminance distribution in the central area.

For example, the second curvature of the outer concave surface 12 is about 1.5 times to about 5 times greater than the fourth curvature of the inner concave surface 14. In this case, the inner concave surface 14 having the fourth curvature that is relatively small refracts the light emitted in the lateral direction of the lens or toward the edge area of the body 10 to the direction of the outer curved surface. The outer concave surface 12 having the second curvature greater than the fourth curvature can concentrate the light emitted in the lateral direction of the lens or toward the edge area of the body 10 in the central area. Accordingly, the light illuminance distribution can be uniform in the overhead area of the light source, and the light spread (or leakage) to the edge area of the lens can be prevented. Here, when a magnification of the second curvature is smaller than that of its magnification range, the light may spread to the edge area of the lens. In addition, when it is greater than that of its magnification range, the illuminance distribution may not be uniform.

In the lens for a backlight of this exemplary embodiment, the body 10 is formed in a bell shape, as shown in FIG. 1. For example, the body 10 has one section formed in a substantially hysteresis loop shape with respect to the center of the body 10, as shown in FIG. 2. The hysteresis loop shape section has two inflection points P1 and P2. In this case, the convex surfaces 11 and 13 are located over the inflection points P1 and P2 and the concave surfaces 12 and 14 are located under the inflection points P1 and P2. The first inflection point P1 is located at a boundary between the outer convex surface 11 and the outer concave surface 12, and the second inflection point P2 is located at a boundary between the inner convex surface 13 and the inner concave surface 14. When a total height T1 of the body 10 is 1, a height T2 of the first inflection point P1 from the top of the body 10 can range from about 0.1 of T1 to about 0.5 of T1. A height T3 of the second inflection point P2 from the top of the body 10 can range from about 0.5 of T1 to about 0.9 of T1. Further, when a maximum width T4 of the body 10 is 1, a maximum interval T5 between the first two opposite inflection points P1 can range from about 0.5 of T4 to about 0.9 of T4. A maximum interval T2 between the second two opposite inflection points P2 can range from about 0.2 of T4 to about 0.6 of T4. The heights and intervals of the first and second inflection points P1 and P2 may be changed to adjust the illuminance distribution of the light emitted via the lens. This is because the heights and intervals of the first and second inflection points P1 and P2 depend on the curvatures of the curved surfaces.

The lens for a backlight of this exemplary embodiment may further include a protruding member 20 disposed in a lower peripheral area of the body 10. For example, the protruding member 20 is formed in a substantially circular strip, and the light source of the backlight is located in an internal space defined by the protruding member 20. In other words, a light emitting diode (LED) element for emitting white light is located in a central space defined by the protruding member 20.

The lens for a backlight may further include a plurality of fixing protrusions 30 protruding from the bottom area of the protruding member 20. The use of the fixing protrusions 30 allows the lens for a backlight of this exemplary embodiment to be fixed over the light source. The fixing protrusions of a cylindrical shape are shown in FIGS. 1 and 2. The protrusions are not limited thereto and may be formed, for example, in a hook shape. The fixing protrusions 30 may be omitted, if necessary. For example, the fixing protrusions 30 may be omitted if the protruding member 20 is directly attached to the light source using an adhesive member.

The foregoing description has illustrated that one convex surface and one concave surface having a different curvature are provided in each of the inner and outer sides of the body of the lens. However, the embodiments of the present invention are not limited thereto. For example, a plurality of convex surfaces and a plurality of concave surfaces can be provided in each of the inner and outer sides of the body of the lens according to this exemplary embodiment. In other words, a plurality of convex surfaces and a plurality of concave surfaces may be provided in each of the outer and inner surface areas of the body to have different curvatures. In this case, the number of the convex surfaces may differ from that of the concave surfaces. Further, the plurality of convex and concave surfaces may be disposed differently depending on certain features of the lens. In other words, the convex surfaces may be located in a portion of the edge area of the body as well as the central area thereof, and the concave surfaces may be located in a portion of the central area of the body.

A backlight for a backlight assembly including a lens for a backlight according to an exemplary embodiment of the present invention will now be described.

Figure 5:
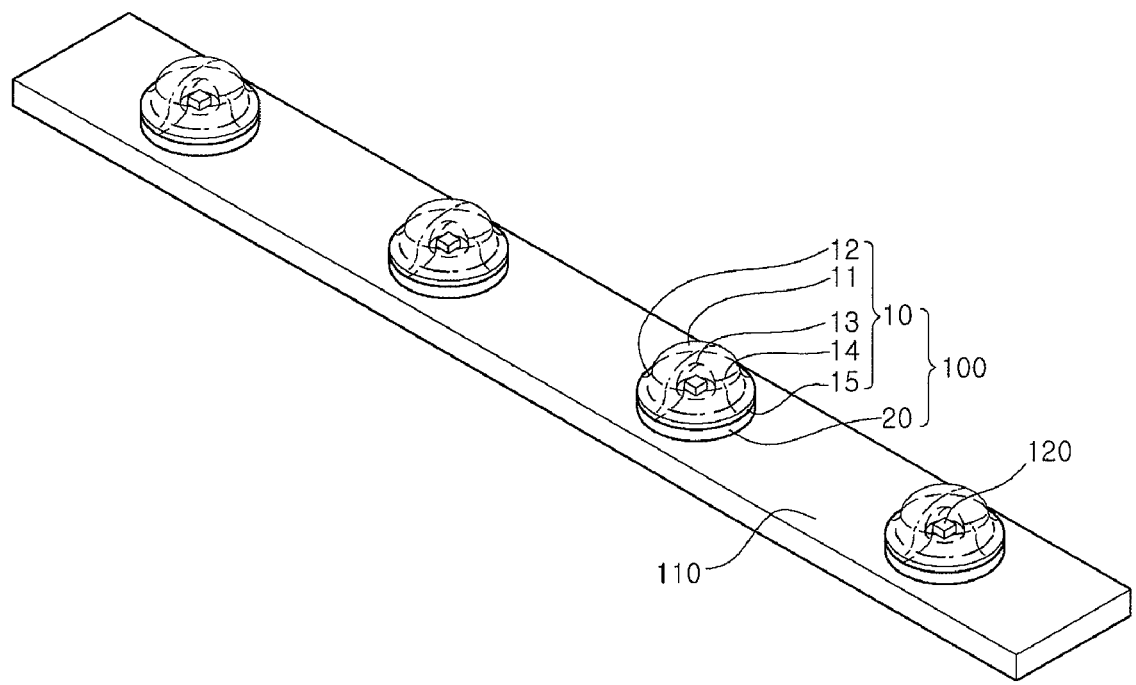
FIG. 5 is a perspective view schematically illustrating a backlight according to an exemplary embodiment of the present invention.
Figure 6:
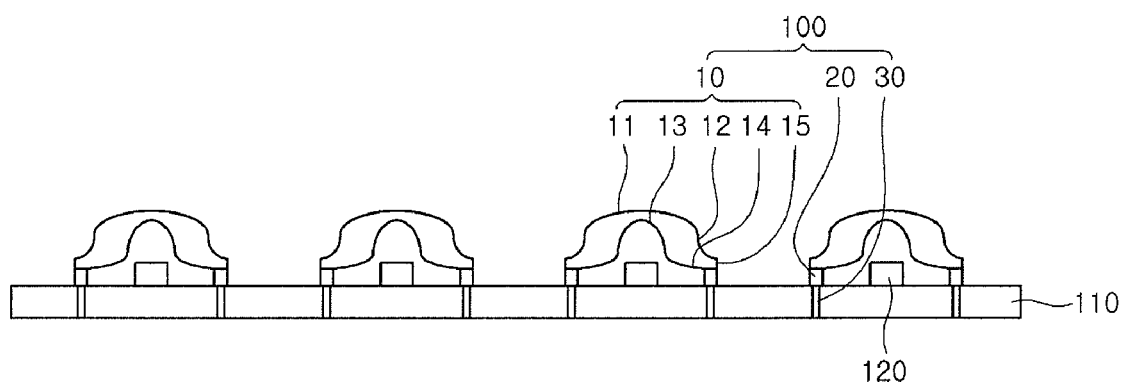
FIG. 6 is a sectional view illustrating the backlight of FIG. 5.
Figure 7:
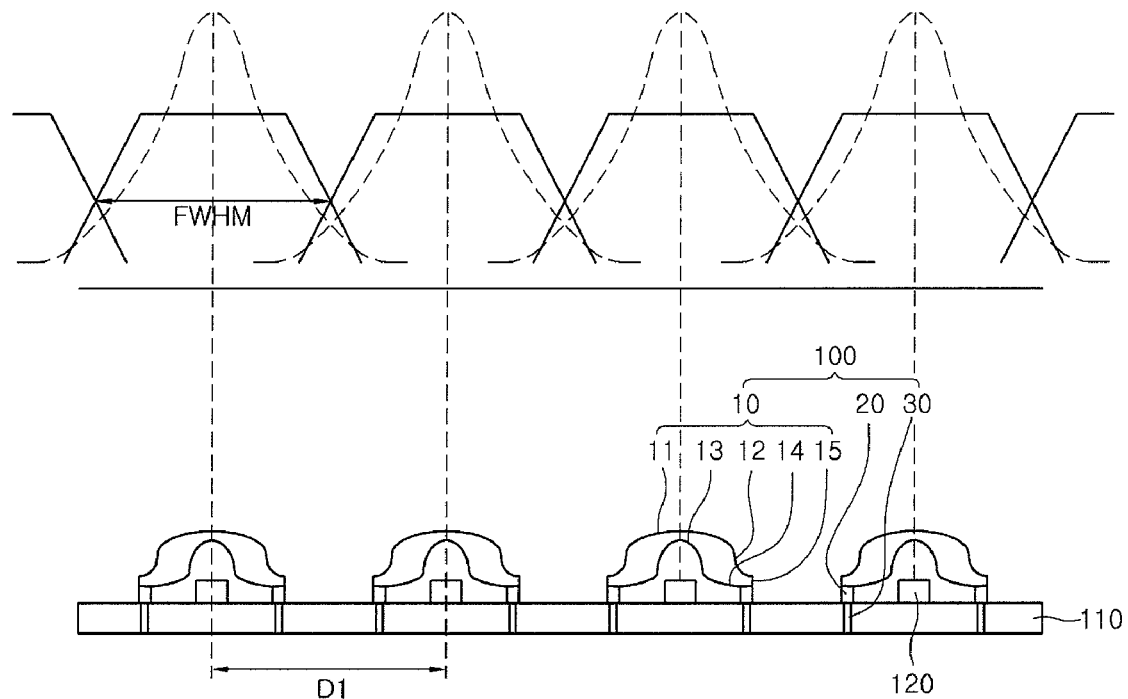
FIG. 7 is a view illustrating an operation of the backlight of FIG. 5.
Figure 8:
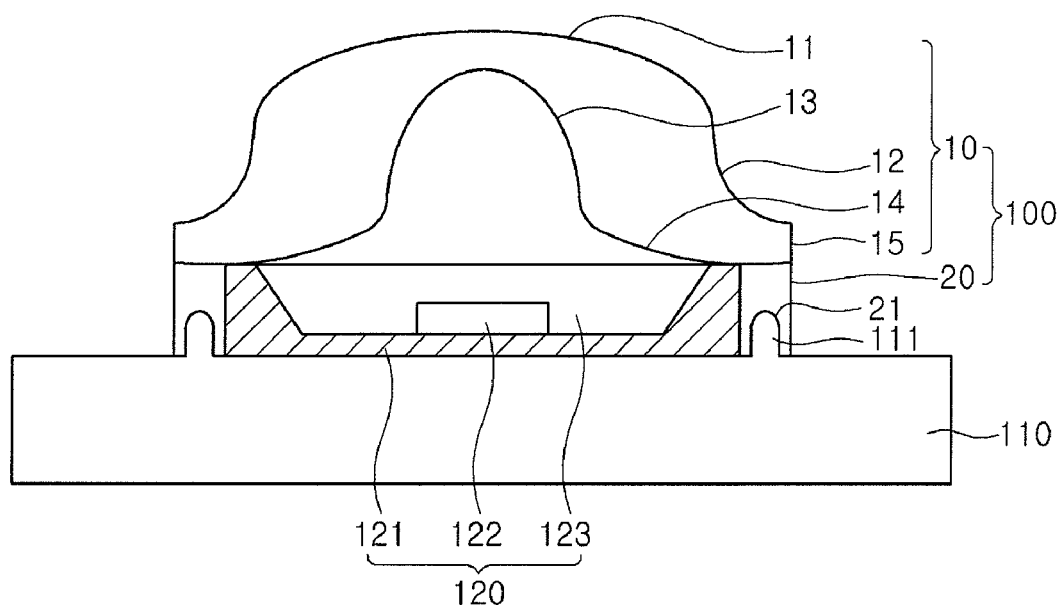
FIG. 8 is a sectional view illustrating a backlight according to an exemplary embodiment of the present invention.
Figure 9:
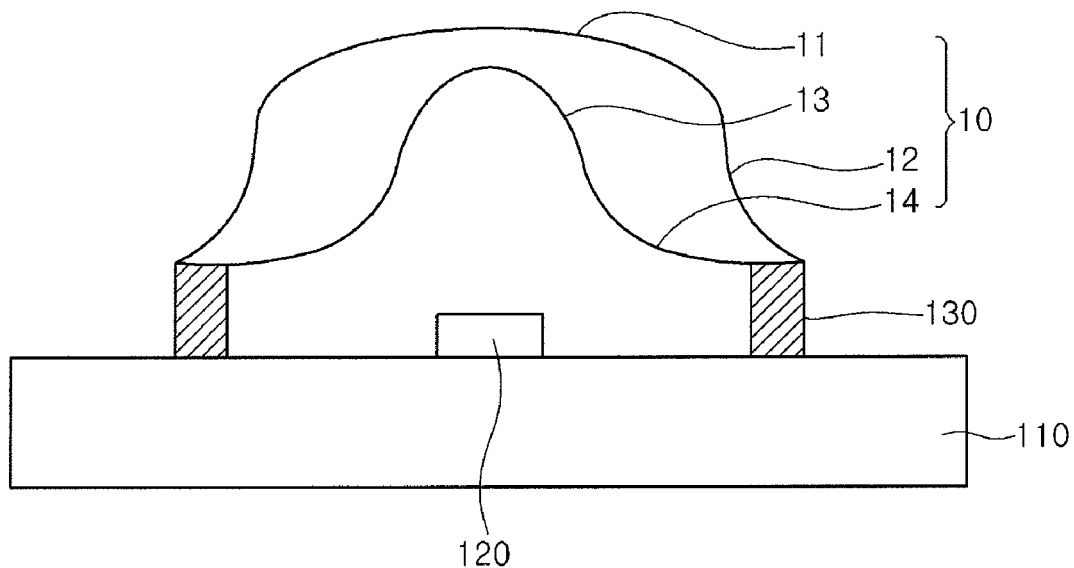
FIG. 9 is a sectional view illustrating a backlight according to an exemplary embodiment of the present invention.

FIG. 5 is a perspective view schematically illustrating a backlight according to an exemplary embodiment of the present invention, and FIG. 6 is a sectional view illustrating the backlight of FIG. 5. FIG. 7 is a view illustrating an operation of the backlight of FIG. 5. FIG. 8 is a sectional view illustrating a backlight according to an exemplary embodiment of the present invention. FIG. 9 is a sectional view illustrating a backlight according to an exemplary embodiment of the present invention.

Referring to FIGS. 5 to 9, the backlight according to this exemplary embodiment includes a substrate 110, a plurality of LED elements 120 mounted on the substrate 110, and a plurality of lenses 100 respectively provided over the LED elements 120. Each of the lenses 100 includes a light transmissive body 10. The body 10 includes an outer convex surface 11 disposed in a central area of the body 10 and having a first curvature, an outer concave surface 12 having a second curvature and extending from an end of the outer convex surface 11 to an edge of the body 10, an inner convex surface 13 disposed in the central area and having a third curvature greater than the first curvature, an inner concave surface 14 having a fourth curvature smaller than the second curvature and extending from an end of the inner convex surface 13 to the edge of the body 10, and a vertical surface 15 for connecting between the end of the outer concave surface 12 and the end of the inner concave surface 14.

The lens 100 further includes a protruding member 20 extending from a lower end of the body 10. For example, each of the LED elements 120 is disposed in an internal space defined by the protruding member 20. In other words, the LED element 120 is disposed below or under a virtual horizontal plane connected between the ends of the inner concave surface 14. This allows light from the LED element 120 to be emitted outside the lens 100 through the entire inner concave surface 14. However, if the LED element 120 is disposed above the virtual horizontal plane connected between the ends of the inner concave surface 14, the light from the LED element 120 may be emitted outside the lens 100 only through a portion of the inner concave surface 14, thus not obtaining uniform illuminance distribution. Accordingly, the protruding member 20 can be disposed in the lower end area of the body 10 (e.g., beneath the ends of the inner concave surface 14), so that the ends of the inner concave surface 14 are spaced apart from the substrate 110, as described previously. Of course, the protruding member 20 may be omitted if a recess is formed in the substrate 110, and then, the LED element 120 can be disposed in the recess.

In this exemplary embodiment, the lens 100 may further include fixing protrusions 30 for fixing the lens 100 to the substrate 110. To this end, the substrate 110 includes holes corresponding to the fixing protrusions 30. The fixing protrusions 30 are inserted into the holes of the substrate 110 having the LED element 120 mounted thereon, so that the lens 100 of this exemplary embodiment is fixed over the LED element 120.

The substrate 110, on which the lenses 100 are fixed and disposed, may be a rectangular bar-shaped printed circuit board (PCB). This PCB may comprise a metal core PCB (MCPCB) or a PCB of FR4. Alternatively, the substrate 110 may have a variety of shapes depending on the structure of a backlight assembly. Although not shown, the substrate 110 includes a plurality of interconnections to supply power to the plurality of LED elements 120 mounted on the substrate 110. Terminals to be connected to external power supply terminals may also be disposed in both edges of the substrate 110.

The LED element 120, which is mounted on the substrate 110, can be an LED chip for emitting white light. The LED element 120 is not limited thereto. For example, the LED element 120 may include at least one red LED chip for emitting red light, at least one green LED chip for emitting green light, and at least one blue LED chip for emitting blue light. In this case, the LED element 120 emits white light by mixing the red, green and blue lights. The LED element 120 may further include a package for packaging the chips.

In the backlight according to this exemplary embodiment, an interval D1 between the LED elements 120 can be adjusted in a predetermined range. In other words, the plurality of LED elements 120 disposed on the substrate 110 are spaced apart from each other by the light diffusion distance (FWHM) of the illuminance distribution of the lens 100. The illuminance distribution of the light emitted from the LED element 120 has a substantially rectangular shape by means of the lens 100, which is disposed over the LED element 120, as shown in FIG. 4. Accordingly, when the interval D1 between the LED elements 120 is greater than the light diffusion distance (FWHM) of the lenses 100, a dark portion is generated between the LED elements 120. When the interval D1 between the LED elements 120 is much smaller than the light diffusion distance (FWHM) of the lenses 100, a light portion is generated due to light overlapping between the adjacent LED elements. Therefore, the interval D1 between the adjacent LED elements 120 is substantially the same as the light diffusion distance (FWHM) of the lens, as shown in FIG. 7. In this case, as described above, the interval D1 between the adjacent LED elements 120 greater than the light diffusion distance (FWHM) can reduce the number of the LED elements 120 used in a single backlight. The dotted line of FIG. 7 denotes the illuminance distribution of the LED elements 120 without the lens 100 of this exemplary embodiment. It can be seen from the dotted line that the light intensity is great in a central overhead area of the LED elements 120 and is small between the LED elements 120. This causes light and dark portions to appear explicitly in the backlight. To reduce these light and dark portions, the interval D1 between the LED elements 120 may be shortened. Accordingly, a number of LED elements 120 are used. However, the illuminance distribution of the lens 100 indicated by a solid line in FIG. 7 is uniform within a predetermined width in the overhead area of the LED element 120s, thereby allowing the interval between the LED elements 120 to be increased. Accordingly, the number of the LED elements 120 can be reduced.

Of course, the embodiments of the present invention are not limited thereto, for example, the interval between the LED elements 120 may be set to about ±20% of the light diffusion distance (FWHM). In other words, if the light diffusion distance is about 1, the interval between the LED elements can be about 0.8 to about 1.2. This may cause the dark or light portions. However, because the backlight according to an exemplary embodiment of the present invention is disposed inside a backlight assembly, small dark and light portions can be eliminated, for example, by a diffusion plate and/or a luminance improving plate.

Various modifications may be made to the backlight according to this exemplary embodiment. For example, as shown in FIG. 8, a groove 21 may be formed in a lower surface of the protruding member 20, which is disposed in the lower end of the body 10 of the lens 100, and the substrate 110 includes a protrusion 111 corresponding to the groove 21. This enables the lens 100 to be fixed to the substrate 110. Further, the LED element 120 may include a housing 121 disposed in an internal space defined by the protruding member 20 of the lens 100, an LED chip 122 mounted in the housing 121, and a molding member 123 for encapsulating the LED chip 122, as shown in FIG. 8. Referring to FIG. 9, the lens 100 includes a body 10 that includes an outer convex surface 11 disposed in a central area of the body 10 and having a first curvature, an outer concave surface 12 having a second curvature and extending from an end of the outer convex surface 11 to an edge of the body 10, an inner convex surface 13 disposed below the outer convex surface and having a third curvature greater than the first curvature, and an inner concave surface 14 having a fourth curvature smaller than the second curvature and disposed between the inner convex surface 13 and the outer concave surface 12. Further, a separate light transmissive or opaque adhesive member 130 is disposed between the lens 100 and the substrate 110 to couple them to each other.

A backlight having a bar-shaped lens according to an exemplary embodiment of the present invention will now be described. A description of components that are the same or similar as those described above will be omitted. The following features may be applied to the previous exemplary embodiments.

Figure 10:
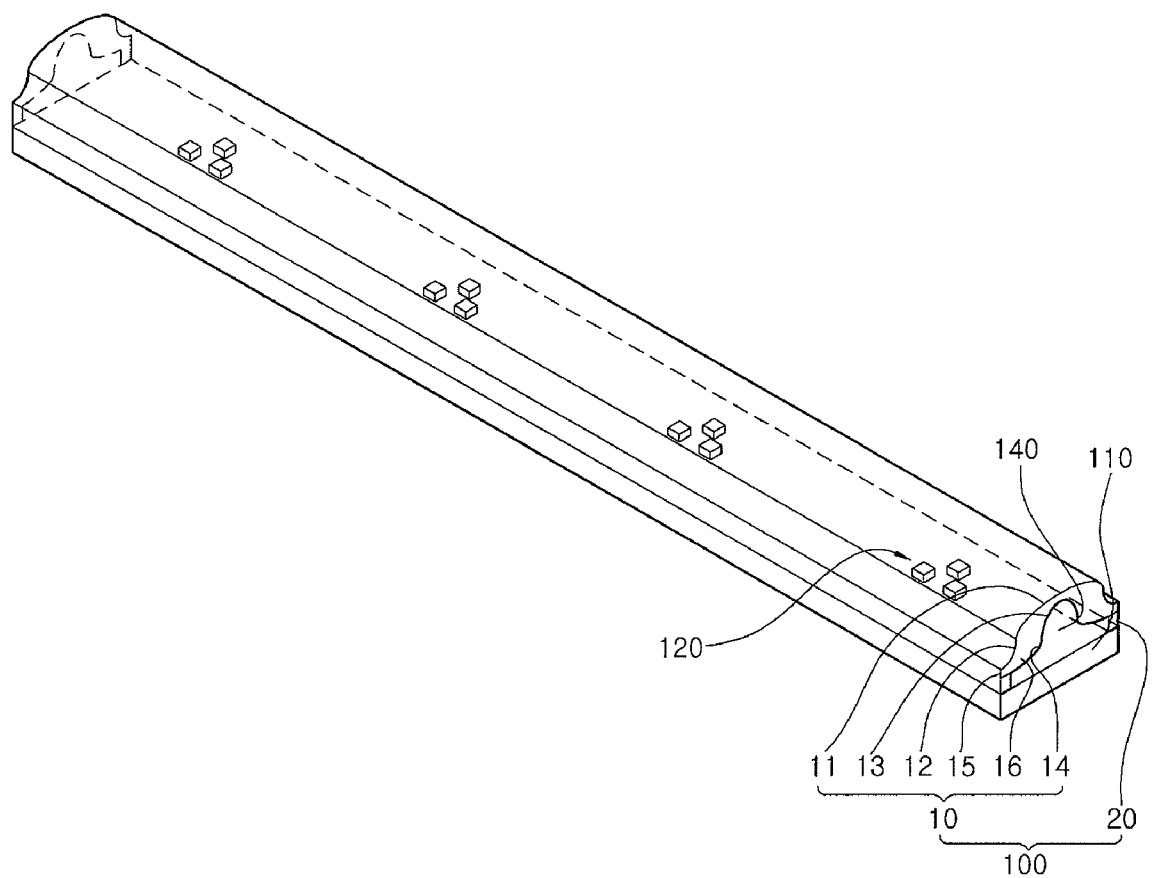
FIG. 10 is a perspective view schematically illustrating a backlight according to an exemplary embodiment of the present invention.

FIG. 10 is a perspective view schematically illustrating a backlight according to an exemplary embodiment of the present invention.

Referring to FIG. 10, the backlight according to this exemplary embodiment includes a substrate 110, a plurality of LED elements 120 mounted on the substrate 110, and a bar-shaped lens 100 disposed over the LED elements 120. A light transmissive filler 140 may be provided between the bar-shaped lens 100 and the substrate 110.

The lens 100 has a size equal to or smaller than that of the substrate 110. The LED element 120 includes red, green and blue LED chips. The lens 100 includes a bar-shaped body 10, and a protruding member 20 disposed in both longitudinal edges of the body 10.

The body 10 includes an outer convex surface 11 disposed in a longitudinally extending central area of the body 10 and having a first curvature, an outer concave surface 12 having a second curvature and extending from an end of the outer convex surface 11 to a longitudinally extending edge of the body 10, an inner convex surface 13 disposed below the outer convex surface 11 in the longitudinally extending area and having a third curvature greater than the first curvature, an inner concave surface 14 having a fourth curvature smaller than the second curvature and extending from an end of the inner convex surface 13 to the longitudinally extending edge of the body 10, and a vertical surface 15 for connecting between the end of the outer concave surface 12 and the end of the inner concave surface 14. In this case, the laterally curved outer and inner surfaces extend in the longitudinal direction. Of course, the protruding member 20 is formed in both longitudinally extending edge areas of the body 10. The body 10 further includes vertical planes 16 disposed in both longitudinal ends of the body 10. The vertical plane 16 is coupled to the outer convex surface 11, the outer concave surface 12, the inner convex surface 13, and the inner concave surface 14.

In this exemplary embodiment, the light transmissive filler 140 is filled under the lens 100. This blocks impurities from being introduced at both of the longitudinal ends of the lens 100 to protect the LED elements 120 under the lens 100. For example, the filler 140 may be a material having a different refractive index from the body 10 of the lens 100. The filler 140 may be a material having the same refractive index as the body 10 of the lens 100.

A backlight assembly including a backlight according to an exemplary embodiment of the present invention will now be described.

Figure 11:
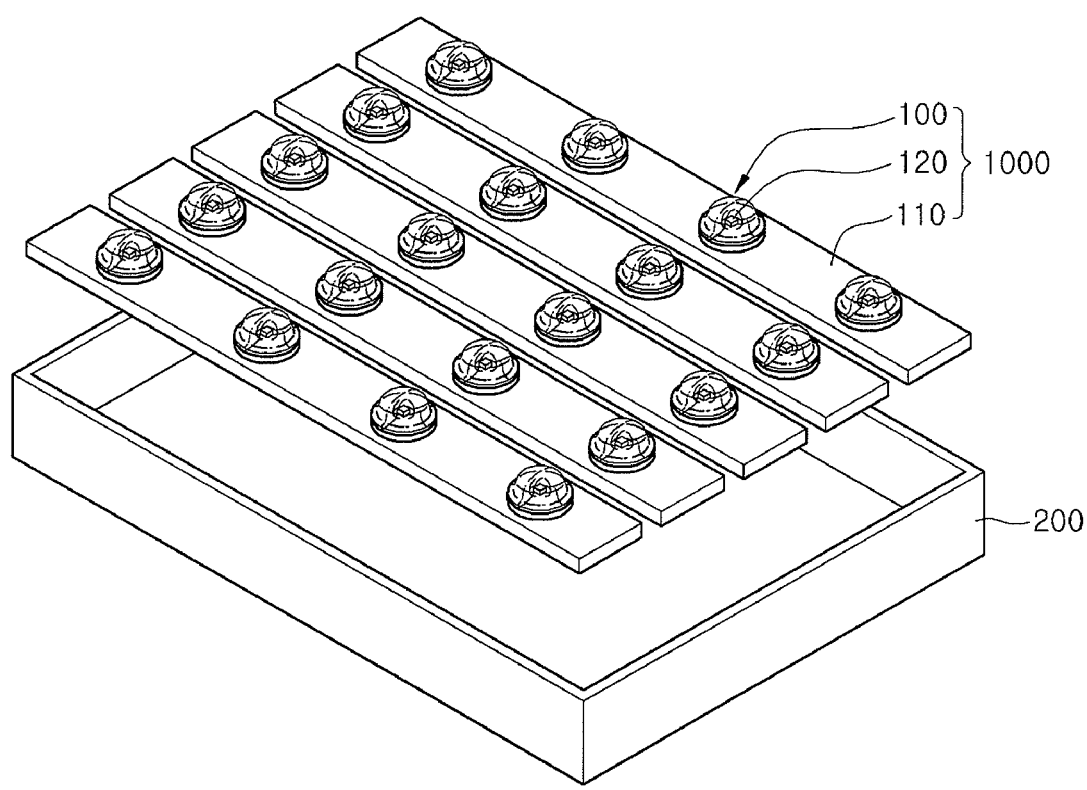
FIG. 11 is an exploded perspective view schematically illustrating a backlight assembly according to an exemplary embodiment of the present invention.
Figure 12:
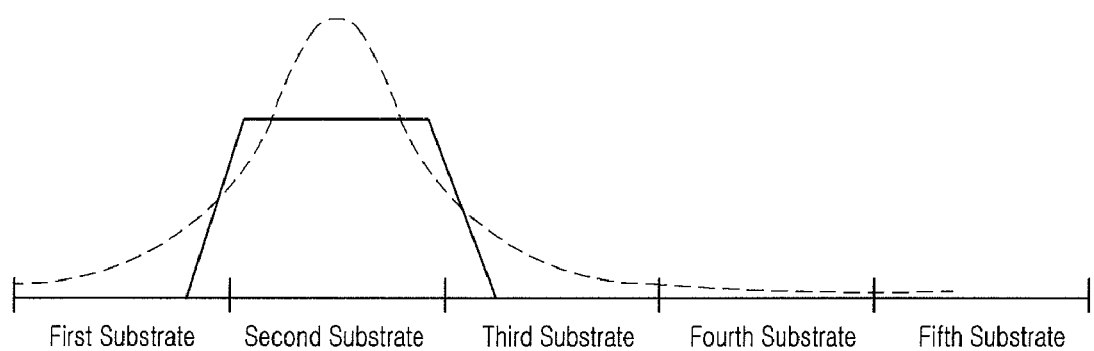
FIG. 12 is a illustrates sequential driving of the backlight assembly of FIG. 11 as compared to that of a conventional backlight assembly.
Figure 13:
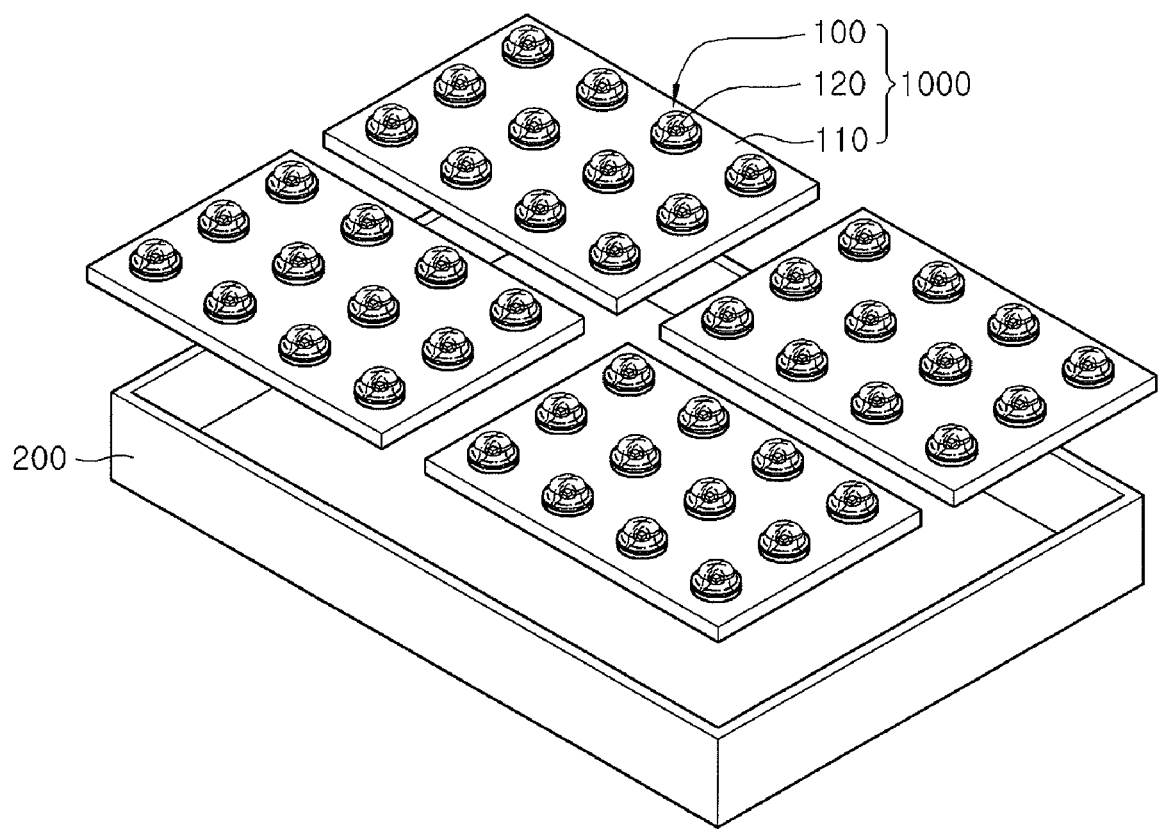
FIG. 13 is an exploded perspective view schematically illustrating a backlight assembly according to an exemplary embodiment of the present invention.
Figure 14:
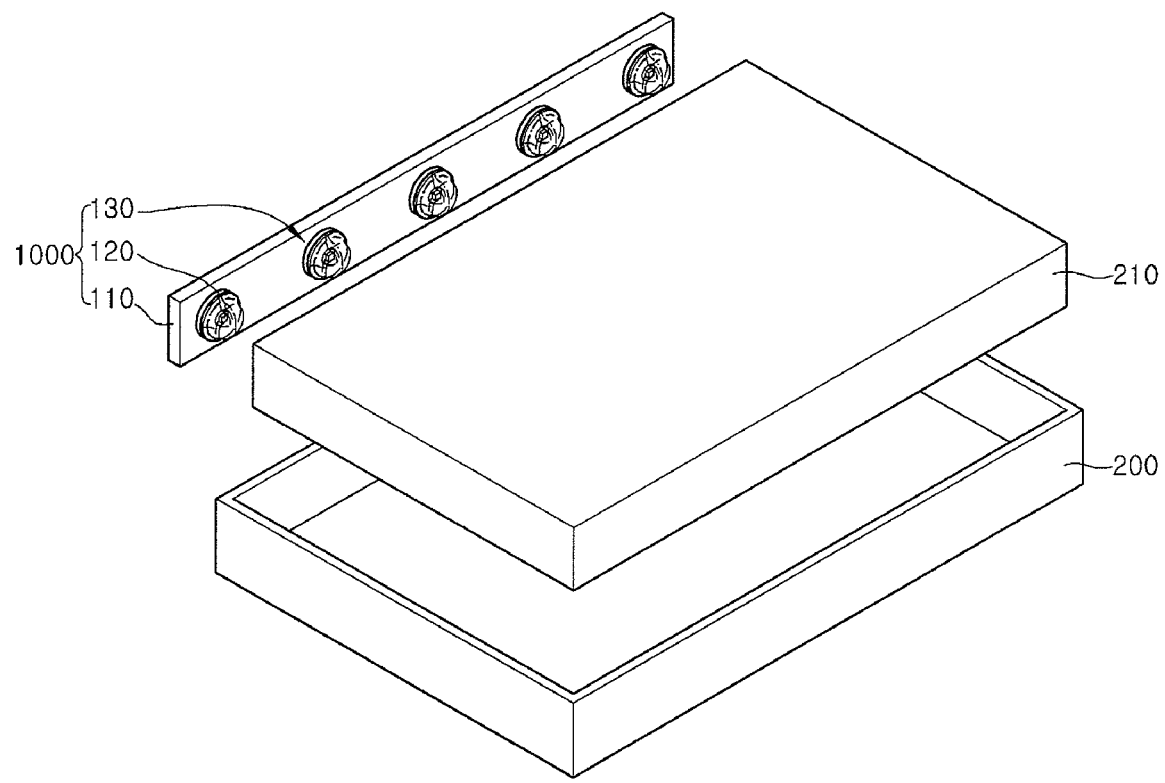
FIG. 14 is an exploded view schematically illustrating a backlight assembly according to an exemplary embodiment of the present invention.

FIG. 11 is an exploded perspective view schematically illustrating a backlight assembly according to an exemplary embodiment of the present invention. FIG. 12 illustrates sequential driving of the backlight assembly of FIG. 11 as compared to that of a conventional backlight assembly. FIG. 13 is an exploded perspective view schematically illustrating a backlight assembly according to an exemplary embodiment of the present invention. FIG. 14 is an exploded perspective view schematically illustrating a backlight assembly according to an exemplary embodiment of the present invention.

Referring to FIG. 11, the backlight assembly according to this exemplary embodiment includes at least one light source unit 1000, and a receiving member 200 for receiving the light source unit 1000.

The light source unit 1000 includes a substrate 110, a plurality of LED elements 120 mounted on the substrate 110, and a plurality of lenses 100 respectively disposed over the LED elements 120. Each of the lenses 100 includes a light transmissive body 10 as shown, for example, in FIG. 1. The body 10 includes an outer convex surface 11 disposed in a central area of the body 10 and having a first curvature, an outer concave surface 12 having a second curvature and extending from an end of the outer convex surface 11 to an edge of the body 10, an inner convex surface 13 disposed in the central area and having a third curvature greater than the first curvature, an inner concave surface 14 having a fourth curvature smaller than the second curvature and extending from an end of the inner convex surface 13 to the edge of the body 10, and a vertical surface 15 for connecting between the end of the outer concave surface 12 and the end of the inner concave surface 14. In this exemplary embodiment, while five light source units 1000 are shown, the number of the light source units 1000 is not limited thereto. For example, the number of light source units 1000 may be increased or decreased depending on the size of the backlight assembly.

Although not shown, the light source unit 1000 may further include a power supply unit for supplying different driving voltages to the respective substrates 110 or to the plurality of LED elements 120 mounted on each substrate 110. This allows the light source units 1000 of this exemplary embodiment to separately emit light on a substrate-by-substrate basis and/or on an element-by-element basis. Of course, the LED elements 120 may be driven on a group-by-group basis. For example, when a driving voltage is applied to one of the substrates 110 and not applied to the other substrates 110, the driven substrate 110 emits light but the other substrates 110 do not emit light. Similarly, when a driving voltage is applied to any one of the plurality of LED elements 120 on the substrate 110 and not applied to the other LED elements 120, only the driven one of the plurality of LED elements 120 emits light.

In this manner, some of the light source units 1000 are selectively driven through local driving (e.g., sequential driving), thereby reducing power consumption in the backlight assembly and a light leakage phenomenon. For example, in a conventional liquid crystal display device, to almost entirely display a dark portion and partially display a light portion, all light source units 1000 in the backlight assembly are driven. This significantly increases power consumption by the backlight assembly and causes light leakage in the light source unit 1000. However, if as described above, only the light source units 1000 in a light colored area are driven and the light source units 1000 in a peripheral dark area are not driven according to an exemplary embodiment of the present invention, the power consumption and light leakage phenomenon in a backlight assembly can be reduced, and natural colors can be represented.

Furthermore, the light source unit 1000 according to this exemplary embodiment includes the lens 100 having the convex surfaces 11 and 13 and the concave surfaces 12 and 14 provided in the inner and outer surfaces areas, thus allowing the light to have a uniform illuminance distribution in the overhead area of the lens 100 and not allowing the light to be emitted in the lateral direction of the lens 100. Accordingly, the light can be prevented from spreading in the lateral direction of the light source unit 1000 locally emitting light, and a light leakage phenomenon due to sequential driving can be prevented.

A solid line of FIG. 12 indicates the illuminance distribution when turning on the light source unit 1000 corresponding to a second substrate area in the backlight assembly according to this exemplary embodiment, and a dotted line indicates the illuminance distribution when turning on a light source unit corresponding to the second substrate area in a conventional backlight assembly. It can be seen from the dotted line that the light spreads to adjacent substrate areas even though only the light source unit in the second substrate area emits the light. Thus, the light spreading to the other substrate areas causes the light leakage phenomenon. However, when the light source unit 1000 in the second substrate area according to this exemplary embodiment emits light, only a small portion of the light spreads to the first and third substrate areas and most of the light is supplied to the overhead area of the second substrate area, as indicated by the solid line. Thus, the light is prevented from spreading to the adjacent substrate areas, thereby reducing the light leakage phenomenon.

Although not shown, in the backlight assembly according to this exemplary embodiment, a reflective plate is disposed under the light source units 1000 and a plurality of optical sheets are disposed over the light source units 1000.

The backlight assembly according to this exemplary embodiment is not limited to the foregoing, and various modifications may be made thereto. For example, the backlight assembly may include a plurality of plate-shaped light source units 1000 arranged in a matrix form as shown in FIG. 13. In this case, a plurality of LED elements 120 mounted on each plate may be independently driven. In addition, the backlight assembly may include a bar-shaped light source unit 1000, and a light guide plate 210 disposed adjacent to the light source unit 1000, as shown in FIG. 14.

A liquid crystal display device including a backlight assembly according to an exemplary embodiment of the present invention will now be described.

Figure 15:
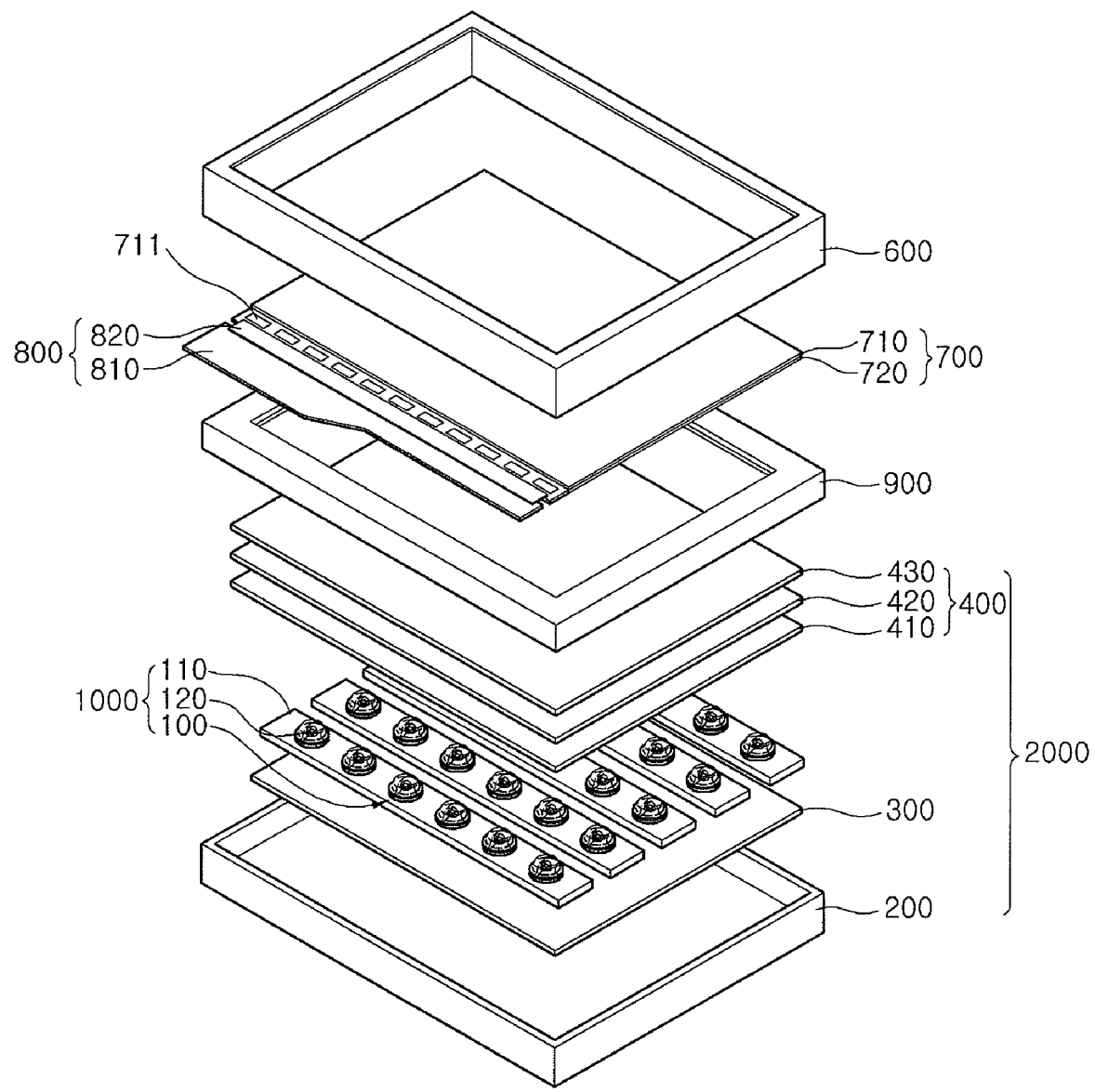
FIG. 15 is an exploded perspective view schematically illustrating a liquid crystal display device according to an exemplary embodiment of the present invention.

FIG. 15 is an exploded perspective view schematically illustrating a liquid crystal display device according to an exemplary embodiment of the present invention.

Referring to FIG. 15, the liquid crystal display device according to this exemplary embodiment includes a backlight assembly 2000 including a plurality of light source units 1000, each including a plurality of LED elements 120 and lenses 100 disposed over the LED elements 120; a liquid crystal display panel 700; a mold frame 900; and an upper receiving member 600.

The liquid crystal display panel 700 includes a color filter substrate 710 and a thin film transistor (TFT) substrate 720. A driving circuit unit 800 is connected to one side of the liquid crystal display panel 700. The driving circuit unit 800 includes a printed circuit board 810 for receiving an external data signal and a power supply signal and supplying them, and a flexible printed circuit board 820 for connecting the printed circuit board 810 to the liquid crystal display panel 700. In this exemplary embodiment, a control IC 711 for applying the data signal to a data line is mounted on the thin film transistor substrate 720 of the liquid crystal display panel 700, as shown in FIG. 15. The present invention is not limited thereto, for example, the control IC 711 may be mounted on the printed circuit board 810 or the flexible printed circuit board 820. Although not shown in FIG. 15, a gate stage unit for supplying a gate signal received from the printed circuit board 810 to a gate line is disposed in one side of the thin film transistor substrate 720.

In this exemplary embodiment, the backlight assembly 2000 includes a lower receiving member 200, a reflective plate 300, the plurality of light source units 1000, and a plurality of optical sheets 400.

The light source unit 1000 includes the plurality of LED elements 120 and lenses 100, wherein each of the lenses 100 includes an outer convex surface 11, an outer concave surface 12, an inner convex surface 13, and an inner concave surface 14. The reflective plate 300 has high light reflectance to reduce light loss. The optical sheet 400 includes a diffusion sheet 410, a polarizing sheet 420, and a luminance improving sheet 430. The diffusion sheet 410 directs light from the light source 100 to a front of the liquid crystal display panel 700 and diffuses the light with uniform distribution over a wide range toward the liquid crystal display panel 700. The polarizing sheet 420 allows incident light to be emitted vertically. In other words, at least one polarizing sheet 420 may be disposed under the liquid crystal display panel 700 to convert light from the diffusion sheet 410 into vertical light. The luminance improving sheet 430 transmits light parallel with its transmitting axis and reflects light perpendicular to the transmitting axis.

In this exemplary embodiment, there is provided the mold frame 900 for fixing and supporting the plurality of light source units 1000 and the optical sheets 400 inside the lower receiving member 200. The liquid crystal display panel 700 is disposed on the mold frame 900. The upper receiving member 600 is disposed over the liquid crystal display panel 700 to secure the liquid crystal display panel 700.

As described above, according to an exemplary embodiment of the present invention, upwardly emitted light is dispersed in a lateral direction of an overhead area of an LED element and laterally emitted light is concentrated upward from the LED element by using the lens having the hysteresis loop-shaped section, thereby making the light illuminance distribution uniform.

In addition, the light can be prevented from spreading in the lateral direction of the light source by using the hysteresis loop-shaped lens.

Further, a backlight assembly according to an exemplary embodiment of the present invention can locally emit light, thus reducing power consumption of the backlight assembly and preventing a light leakage phenomenon.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lens for a backlight, comprising:
a light transmissive body including outer and inner surface areas, the outer surface area having a convex surface and a concave surface, the inner surface area having a convex surface and a concave surface,
wherein the convex surface of the outer surface area is disposed in a central area of the light transmissive body, the concave surface of the outer surface area extends from an end of the convex surface of the outer surface area to an edge of the light transmissive body, the convex surface of the inner surface area is disposed in the central area of the light transmissive body and the concave surface of the inner surface area extends from an end of the convex surface of the inner surface area to the edge of the light transmissive body,
wherein the convex surface of the outer surface area has a curvature different from a curvature of the convex surface of the inner surface area and the concave surface of the outer surface area has a curvature different from a curvature of the concave surface of the inner surface area, and
wherein the outer and inner surface areas include at least an inflection point, respectively.

2. The lens of claim 1, wherein the curvature of the convex surface of the inner surface area is greater than the curvature of the convex surface of the outer surface area, and the curvature of the concave surface of the inner surface area is smaller than the curvature of the concave surface of the outer surface area.

3. The lens of claim 1, wherein the convex surface of the outer surface area has a first curvature; the concave surface of the outer surface area has a second curvature; the convex surface of the inner surface area has a third curvature greater than the first curvature; and the concave surface of the inner surface area has a fourth curvature smaller than the second curvature.

4. The lens of claim 3, wherein the third curvature is 1.5 times to 10 times greater than the first curvature, and the second curvature is 1.5 times to 5 times greater than the fourth curvature.

5. A backlight comprising:
a substrate;
a plurality of light emitting diode (LED) elements mounted on the substrate; and
a plurality of lenses, each lens disposed over an LED element of the plurality of LED elements, each lens including a light transmissive body having outer and inner surface areas, the outer surface area having a convex surface and a concave surface, the inner surface area having a convex surface and a concave surface,
wherein the convex surface of the outer surface area is disposed in a central area of the light transmissive body, the concave surface of the outer surface area extends from an end of the convex surface of the outer surface area to an edge of the light transmissive body, the convex surface of the inner surface area is disposed in the central area of the light transmissive body and the concave surface of the inner surface area extends from an end of the convex surface of the inner surface area to the edge of the light transmissive body, wherein the convex surface of the outer surface area has a curvature different from a curvature of the convex surface of the inner surface area and the concave surface of the outer surface area has a curvature different from a curvature of the concave surface of the inner surface area, and wherein the outer and inner surface areas include at least an inflection point, respectively.

6. The backlight of claim 5, wherein the convex surface of the outer surface area has a first curvature; the concave surface of the outer surface area has a second curvature; the convex surface of the inner surface area has a third curvature greater than the first curvature; and the concave surface of the inner surface area has a fourth curvature smaller than the second curvature.

7. The backlight of claim 6, wherein the LED element is disposed under the concave surface of the inner surface area.

8. The backlight of claim 5, wherein each lens further comprises a protruding member disposed in a lower peripheral area of the light transmissive body.

9. The backlight of claim 5, wherein each lens further comprises a fixing means for fixing the light transmissive body to the substrate.

10. The backlight of claim 5, wherein when a full width at half maximum (FWHM) of an illuminance distribution of each lens is 1, an interval between adjacent LED elements of the plurality of LED elements is 0.8 to 1.2.

11. The backlight of claim 5, wherein the plurality of LED elements emit light on an element-by-element basis, or on a group-by-group basis when the plurality of LED elements are divided into at least two groups.

12. A backlight comprising:
a substrate;
a plurality of light emitting diode (LED) elements mounted on the substrate; and
a lens disposed over the plurality of LED elements, the lens including a light transmissive body having outer and inner surface areas, the outer surface area having a convex surface and a concave surface, the inner surface area having a convex surface and a concave surface,
wherein the convex surface of the outer surface area is disposed in a central area of the light transmissive body, the concave surface of the outer surface area extends from an end of the convex surface of the outer surface area to an edge of the light transmissive body, the convex surface of the inner surface area is disposed in the central area of the light transmissive body and the concave surface of the inner surface area extends from an end of the convex surface of the inner surface area to the edge of the light transmissive body,
wherein the convex surface of the outer surface area has a curvature different from a curvature of the convex surface of the inner surface area and the concave surface of the outer surface area has a curvature different from a curvature of the concave surface of the inner surface area, and
wherein the outer and inner surface areas include at least an inflection point, respectively.

13. The backlight of claim 12, wherein the convex surface of the outer surface area has a first curvature; the concave surface of the outer surface area has a second curvature; the convex surface of the inner surface area has a third curvature greater than the first curvature; and the concave surface of the inner surface area has a fourth curvature smaller than the second curvature.

14. The backlight of claim 13, wherein the light transmissive body extends in a longitudinal direction.

15. The backlight of claim 12, further comprising a filler disposed between the lens and the plurality of LED elements.

16. A backlight assembly comprising:
a light source unit including a substrate; a plurality of light emitting diode (LED) elements disposed on the substrate to emit light; and a plurality of lenses, each lens disposed over an LED element of the plurality of LED elements, each lens including a light transmissive body having outer and inner surface areas, the outer surface area having a convex surface and a concave surface, the inner surface area having a convex surface and a concave surface,
wherein the convex surface of the outer surface area has a curvature different from a curvature of the convex surface of the inner surface area and the concave surface of the outer surface area has a curvature different from a curvature of the concave surface of the inner surface area; and
a receiving member for receiving the light source unit.

17. The backlight assembly of claim 16, wherein the convex surface of the outer surface area is disposed in a central area of the light transmissive body and has a first curvature; the concave surface of the outer surface area has a second curvature and extends from an end of the convex surface of the outer surface area to an edge of the light transmissive body; the convex surface of the inner surface area is disposed in the central area of the light transmissive body and has a third curvature greater than the first curvature; and the concave surface of the inner surface area has a fourth curvature smaller than the second curvature and extends from an end of the convex surface of the inner surface area to the edge of the light transmissive body.

18. The backlight assembly of claim 16, wherein the plurality of LED elements emit light on an element-by-element basis, on a group-by-group basis when the plurality of LED elements are divided into at least two groups, or on a substrate-by-substrate basis when more than one substrate is included in the light source unit.

19. The backlight assembly as claimed in claim 16, further comprising a light guide plate disposed adjacent to the light source unit.

20. A liquid crystal display device comprising:
a liquid crystal display panel for displaying an image; and
a backlight assembly for emitting light to the liquid crystal display panel,
wherein the backlight assembly includes a plurality of light emitting diode (LED) elements for emitting light; and a plurality of lenses, each lens including a light transmissive body having outer and inner surface areas, the outer surface area having a convex surface and a concave surface, the inner surface area having a convex surface and a concave surface,
wherein the convex surface of the outer surface area has a curvature different from a curvature of the convex surface of the inner surface area and the concave surface of the outer surface area has a curvature different from a curvature of the concave surface of the inner surface area.

* * * * *